United States Patent
Agarwala et al.

(10) Patent No.: US 7,673,076 B2
(45) Date of Patent: Mar. 2, 2010

(54) CONCURRENT READ RESPONSE ACKNOWLEDGE ENHANCED DIRECT MEMORY ACCESS UNIT

(75) Inventors: Sanjive Agarwala, Richardson, TX (US); Kyle Castille, Houston, TX (US); Quang-Dieu An, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 267 days.

(21) Appl. No.: 11/128,598

(22) Filed: May 13, 2005

(65) Prior Publication Data

US 2006/0259648 A1 Nov. 16, 2006

(51) Int. Cl.
*G06F 3/00* (2006.01)
*G06F 12/00* (2006.01)
(52) U.S. Cl. .............................. 710/5; 710/21; 710/22; 711/168; 712/9
(58) Field of Classification Search ........................ None
See application file for complete search history.

(56) References Cited

U.S. PATENT DOCUMENTS

| | | | | | |
|---|---|---|---|---|---|
| 3,491,341 | A | * | 1/1970 | Alaimo | 710/60 |
| 4,470,115 | A | * | 9/1984 | Wehr | 710/36 |
| 4,748,588 | A | * | 5/1988 | Norman et al. | 713/400 |
| 5,875,343 | A | * | 2/1999 | Binford et al. | 710/263 |
| 5,883,814 | A | * | 3/1999 | Luk et al. | 716/2 |
| 5,898,895 | A | * | 4/1999 | Williams | 710/60 |
| 6,370,611 | B1 | * | 4/2002 | Callison et al. | 711/105 |
| 6,496,740 | B1 | * | 12/2002 | Robertson et al. | 700/20 |
| 6,594,713 | B1 | * | 7/2003 | Fuoco et al. | 710/31 |
| 6,681,270 | B1 | * | 1/2004 | Agarwala et al. | 710/40 |
| 2002/0120796 | A1 | * | 8/2002 | Robertson | 710/54 |
| 2003/0021239 | A1 | * | 1/2003 | Mullendore et al. | 370/276 |
| 2004/0044857 | A1 | * | 3/2004 | Jeddeloh et al. | 711/154 |
| 2004/0123013 | A1 | * | 6/2004 | Clayton et al. | 710/310 |
| 2005/0188120 | A1 | * | 8/2005 | Hayden et al. | 710/22 |

\* cited by examiner

*Primary Examiner*—Eron J Sorrell
*Assistant Examiner*—Dean Phan
(74) *Attorney, Agent, or Firm*—Robert D. Marshall, Jr.; Wade J. Brady, III; Frederick J. Telecky, Jr.

(57) ABSTRACT

An enhanced direct memory access (EDMA) operation issues a read command to the source port to request data. The port returns the data along with response information, which contains the channel and valid byte count. The EDMA stores the read data into a write buffer and acknowledges to the source port that the EDMA can accept more data. The read response and data can come from more than one port and belong to different channels. Removing channel prioritizing according to this invention allows the EDMA to store read data in the write buffer and the EDMA then can acknowledge the port read response concurrently across all channels. This improves the EDMA inbound and outbound data flow dramatically.

2 Claims, 4 Drawing Sheets

CONCURRENT READ RESPONSE ACKNOWLEDGE ENHANCED DIRECT MEMORY ACCESS UNIT

TECHNICAL FIELD OF THE INVENTION

The technical field of this invention is direct memory access units in data processing devices.

BACKGROUND OF THE INVENTION

Current microprocessor designs need to centralize data transfer operations under control of integrated functional units known as data transfer access units or enhanced direct memory access (EDMA) units. EDMA is of most interest here and specifically of interest are EDMA designs employing hub-and-port style architecture. Such EDMAs feature a hub unit, which maintains a queue of transfer requests and provides priority protocol and proper interfacing for the handling of a large number of such requests. Secondly hub-and-port EDMAs have one or more hub interface units (HIU), which each provide a seamless interface between the EDMA hub and its ports. Ports are typically external application units (AU) otherwise known as peripheral units. Internal memory ports are also included among the EDMA ports.

FIG. 1 illustrates the essentials of a prior art microprocessor system having EDMA 100 and central processing unit (CPU) 101. EDMA 100 includes transfer controller 102 and hub interface units (HIU) 104, 105, and 106. Communication between the transfer controller hub unit 102 and HIUs 104, 105, and 106 employs buses 103, 107, 108, 109, and 110. Each HIU provides interface to a single port. Peripheral unit 114 and 115 communication with corresponding HIUs 104 and 105 via respective paths 111 and 112. The microprocessor system also includes the internal memory port device 116 which communications with HIU 106 via path 113. The EDMA 100 responds to transfer requests not only from CPU 101 but also from any of the ports it services. Transfer requests (TR) handled by transfer controller (TC) hub unit 102 involve transfer of data from one port to another. Transfer commands reside in transfer request packets that give all the detailed parameters of a transfer.

FIG. 2 illustrates the functional units of the transfer controller portion of EDMA 200 (prior art). The transfer request processor 201 receives transfer requests from CPU 230 and from one or more HIU 210 via path 228. Transfer request processor 201 passes these requests to queue manager 202. Queue manager 202 receives data transfer request packets (TRP), places them in queue manager RAM 203 and assigns them to one of the P channel priority levels. It is helpful to distinguish TRPs stored in the queue manager RAM 203 as being in the queue, and TRPs stored in the channel registers block 204 as being active. For example, for N=32, EDMA 200 could have four channel priorities and channel register block 204 could hold eight active transfer packets at each priority level. At any given time channel register block 204 could hold up to 32 total TRPs.

If there is no channel available for direct processing of a TRP coming into queue manager 202, it is stored in queue manager RAM 203. The TRP is then submitted to the channel registers 204 at a later time when a channel becomes available. Source ready signal 213 and destination ready signal 215 indicate availability of a channel space within the channel registers 204. Channel registers 204 interface with source pipeline 205 and destination pipeline 206. Source pipeline 205 and destination pipeline 206 are address calculation units for source (read) and destination (write) operations. These pipelines broadcast outputs to M ports of EDMA 200 through M hub interface units 210, which drive the M possible external ports units. FIG. 2 illustrates just one port 229 as an example. When source pipeline space is available, source pipeline 204 passes source ready signal 216 to the channel registers 204, which passes source ready signal 213 to queue manager 202. When destination pipeline space is available, destination pipeline 206 passes destination ready signal 219 to the channel registers 204, which passes destination ready signal 215 to queue manager 202. Queue manager block 202 passes source read commands developed from the transfer packets to channel registers 204 via path 214 and hence to source pipeline 205 via path 217. Queue manager block 202 passes destination write commands developed from the transfer packets to channel registers 204 via path 214 and hence to destination pipeline 205 via path 220. Source valid signal 218 and destination valid signal 221 from channel registers 204 alert the respective pipelines that a valid transfer is ready to be processed.

Signals broadcast from transfer controller (TC) to the hub interface units (HIU) 210 and returning from the HIU to the TC include: source read command 222; destination write command 223; destination write data 224; read response information 227 from HIU to read response FIFO buffer 208; read return data from ports 225 to be stored in write data FIFO buffer 207; TC acknowledge flag 226 from response acknowledge logic 209 to HIU 210.

SUMMARY OF THE INVENTION

The EDMA operation of this invention provides an enhancement feature of earlier EDMA devices. In the present invention, EDMA issues a read command to the source port to request data. The port returns the data along with response information, which contains the channel and valid byte count. The EDMA stores the read data into the write buffer and acknowledges to the source port to inform that the EDMA can accept more data. The read response and data can come from more than one port and belong to different channels. Formerly, the EDMA would prioritize the processing channels and only the channel with the highest priority could be processed. All the other pending channels would wait, which results in idling the ports, which already have data ready to send back to the EDMA. Removing channel prioritizing according to this invention allows the EDMA to store read data in the write buffer the EDMA then can acknowledge the port read response concurrently across all channels and this improves the EDMA inbound and outbound data flow dramatically.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
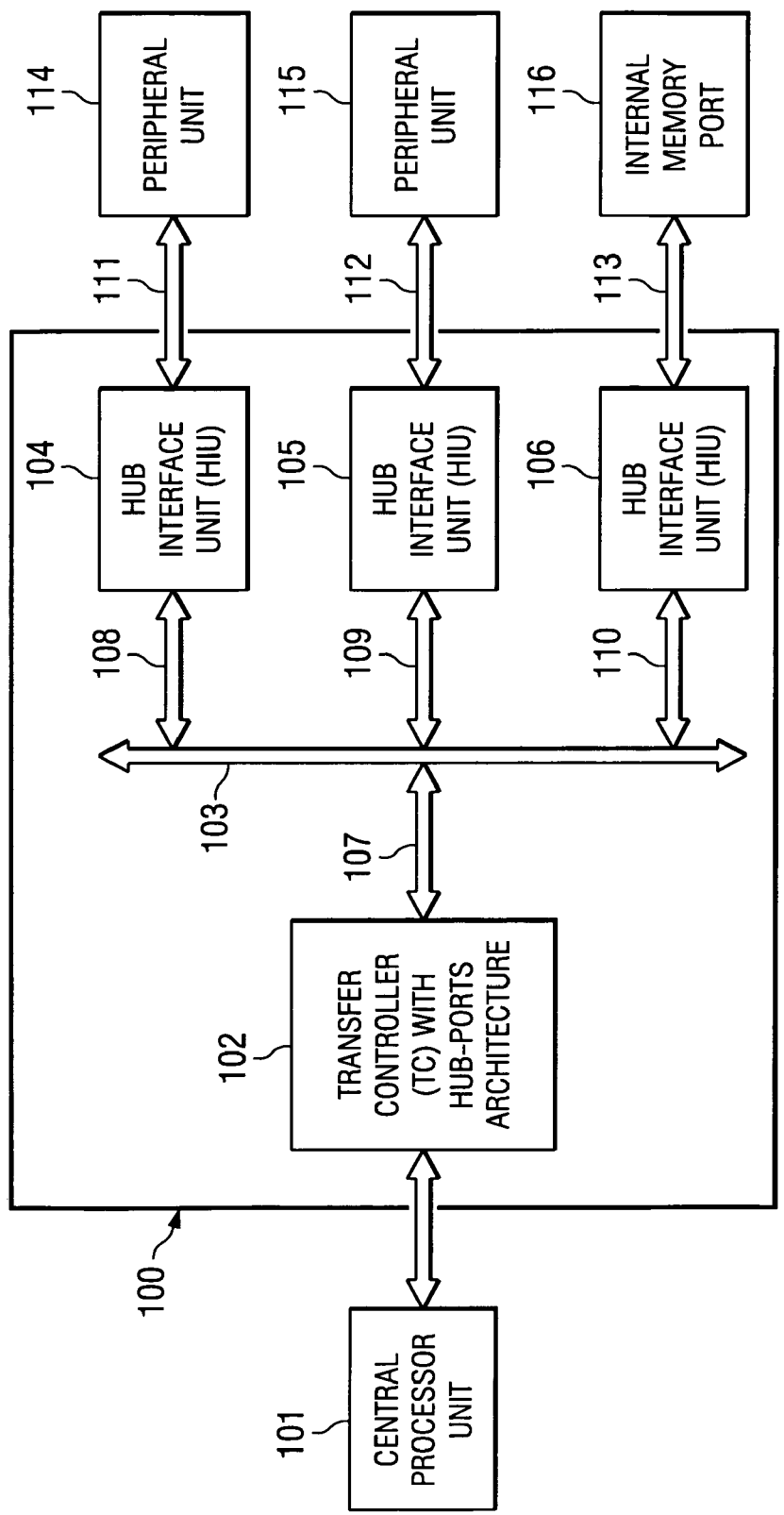
FIG. 1 illustrates the high level functional diagram of an enhanced direct memory access unit (EDMA) with hub-and-port architecture driven by a central processor unit and having a transfer controller interfacing with several hub interface units driving peripheral unit functions (Prior Art)
Figure 2:
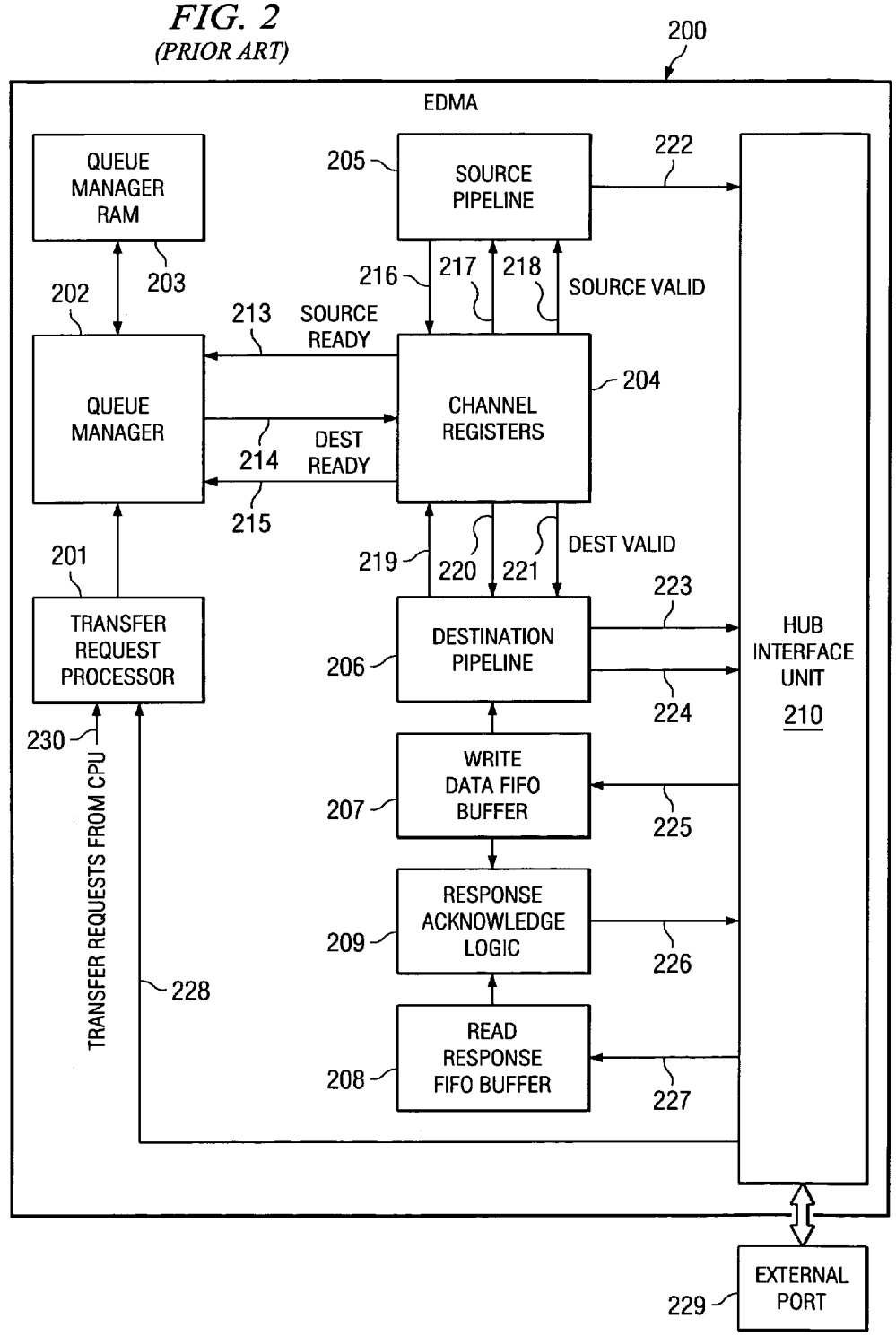
FIG. 2 illustrates in a functional block diagram the basic principal features of the EDMA (Prior Art)
Figure 3:
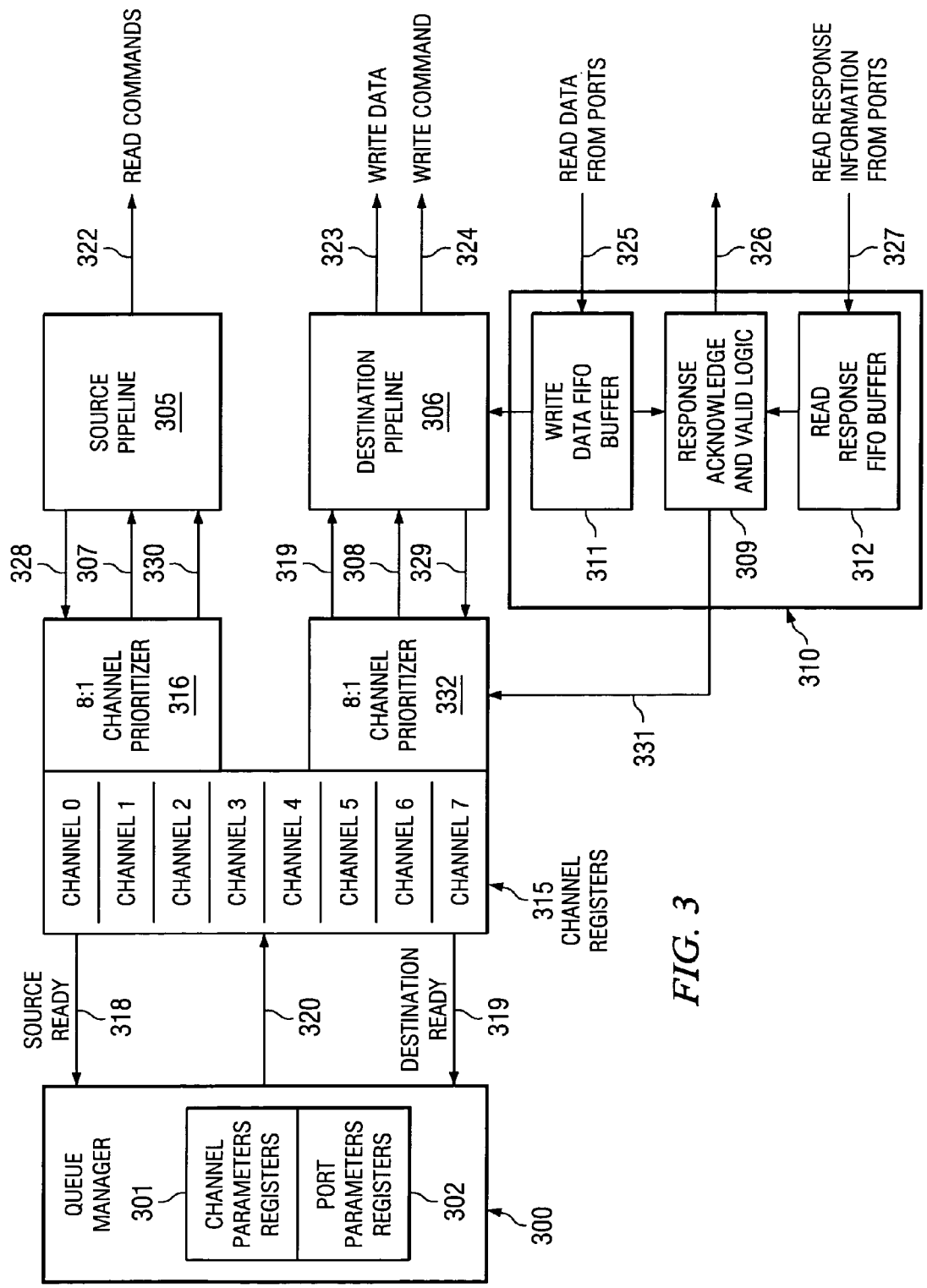
FIG. 3 illustrates the queue manager interface to the EDMA source and destination pipelines.

FIG. 3 illustrates the queue manager 300 and its interface to the EDMA hub unit boundary and particularly the queue manager communications with channel registers 315, channel parameter registers 301 and port parameter registers 302. Channel parameters registers 301 and port parameters registers 302 store critical data regarding for example, types of transfers, mode information, status, and much other information critical to the transfer process.

Channel registers 315 pass information used in source pipeline 305 for generation of read commands 322. Similarly channel registers 315 pass information used in destination pipeline 306 for generation of write command 324 directing passage of write data 323 to the HIU. Read response information 327 from the ports is returned to destination pipeline 306 via data router unit 310. Data router unit 310 includes the two FIFOs: write data FIFO buffer 311; and read response FIFO buffer 312. Response acknowledge logic 309 supplies response acknowledge signal 326 to the HIU indicating the data read has been received.

If a channel in the EDMA is idle and the queue manager 300 has another EDMA entry for that channel, then it reads out the transfer request packet via path 320 for that transfer and sends it to channel registers 315. This information is saved, and that channel is activated inside the EDMA, to begin transferring data. During the transfer, source pipeline 305 and destination pipeline 306 incrementally modify some of the transfer parameters, and channel registers 315 handle updating channel parameter registers 301 and port parameters registers 302. Source pipeline 305 and destination pipeline 306 then send out updated values to the rest of the EDMA. Once the EDMA finishes processing that channel, channel registers 315 will generate a source ready signal 318 or a destination ready signal 319. Queue manager 300 detects completion of a transfer and sends another request to channel registers 315.

Consider the example enhanced direct memory access (EDMA) unit illustrated in FIG. 3. This example EDMA has eight priority channels and four ports. In typical operation, once a read command has been executed no additional read commands can be executed until the corresponding write operations have been concluded. The EDMA delays additional reads until the completion of the pending write. The concurrent read response EDMA of this invention eliminates this limit on the flow of read data to the EDMA.

The concurrent read response acknowledge enhanced DMA of this invention accepts the read response and data from the source ports concurrently across all channels. As long as the EDMA write buffer has enough space, the source port can always return data whenever ready. The source port buffer is not blocked and the EDMA can write the data to the destination port in real time. Utilization of the EDMA bandwidth is maximized.

The invention operates on this sequence. The EDMA issues read command to a source port A to request data. Port A returns the data along with response information. This response information contains the channel and valid byte count. The EDMA stores the read data in the write buffer and acknowledges to the source ports that the EDMA can accept more data. The read response and data can now come from more than one port and belong to different channels. The EDMA prioritizes the processing channels and only the channel with highest priority can proceed. All the other pending channels await which results in idling the ports, which already have data ready to send back to EDMA. Removing channel prioritizing according to this invention allows the EDMA to store additional read data from other channels in the write buffer. The EDMA can then acknowledge to multiple ports and receive read response concurrently across all channels. This improves the EDMA inbound and outbound data flow dramatically.

Figure 4:
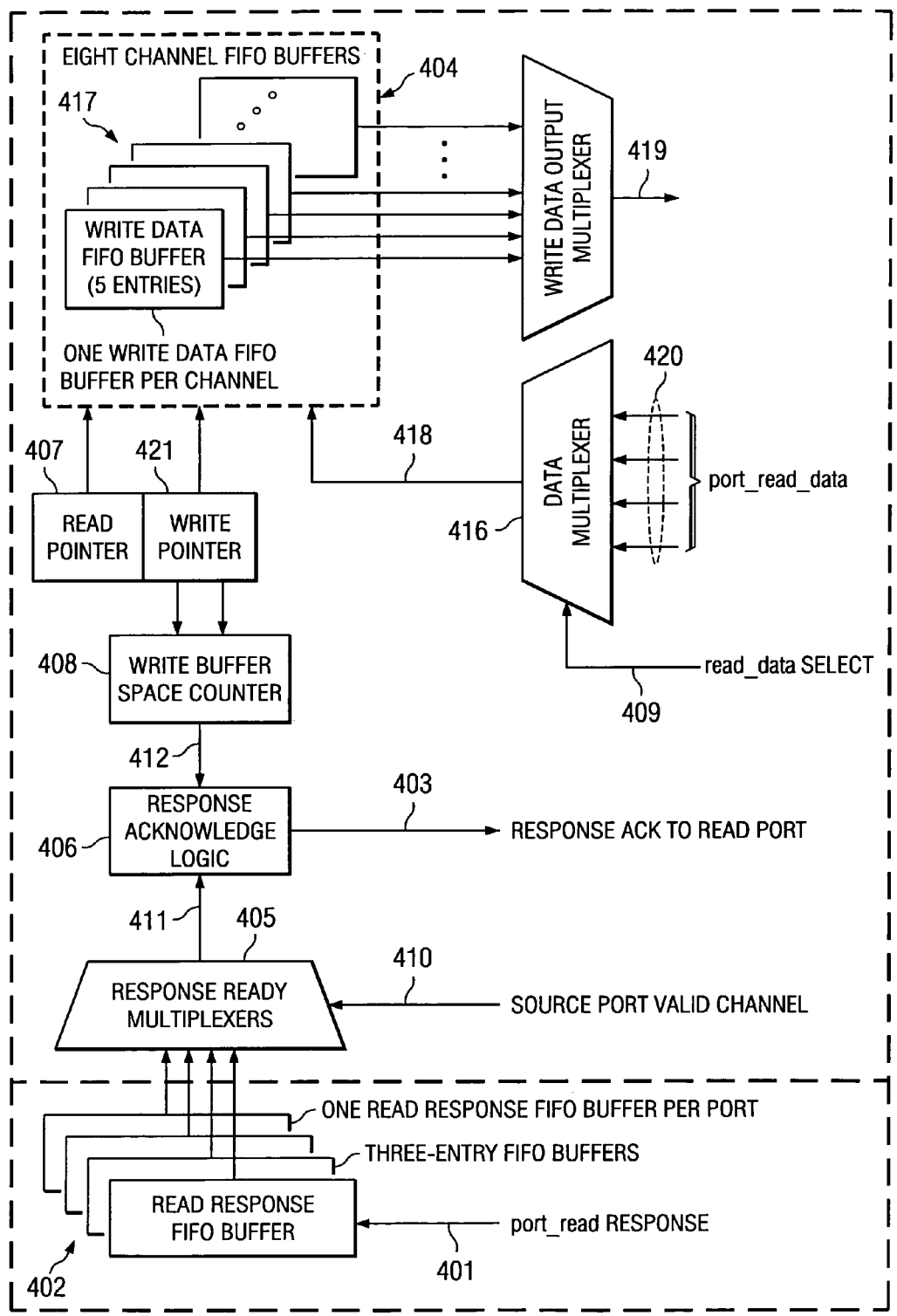
FIG. 4 illustrates the block diagram of the concurrent read response acknowledge EDMA of this invention.

FIG. 4 illustrates the concurrent read response acknowledge of this invention. Port read response 401 from a specific source port (e.g. source port A) containing the channel and valid data byte information for a specific transfer is stored in read response FIFO buffer 402. The EDMA then generates an acknowledge (ACK) signal 403 back to port A signifying that the data will in fact be processed.

In order to process a new response every cycle, multiple three-entry read response FIFOs are provided for each port. The EDMA meanwhile receives a source port valid signal 410 for a given channel and combines this information with the channel number from the read response. The EDMA generates a source ready 411 to determine which channel has read data ready to be processed. Read data 420 from all the ports are multiplexed in data multiplexer 416 to retrieve the data 418 from the responding port for that channel. This data 418 is input to the write data FIFO buffer 404.

Each channel has its own write data FIFO buffer 417. Write pointer 421 identifies the buffer location to be updated and read pointer 407 points to the data to be output to the destination port 419. Write buffer space counter 408 keeps track of the empty space in write data FIFO buffer 404 that is available for additional stored data. The write buffer space counter 408 is updated by: (1) adding the number of bytes written into the buffer; and (2) subtracting by the number of bytes output to the destination port 419. Response acknowledge logic block 406 compares write buffer space counter 408 value with byte count of the port read response. If there is enough space, response acknowledge logic 406 issues a response acknowledge 403 to the source port. The source port in turn can send another read response back if available.

By providing additional write data FIFO buffers 417 one for each channel and additional read response FIFO buffers 402, one for each port the bottleneck in data throughput is greatly relieved. Multiple reads may be processed even before the corresponding pending writes have been completed. Stored read responses enable matching to corresponding write requests to direct stored data from the buffer memory to the corresponding destination.

What is claimed is:

1. A method for data transfer between a plurality of ports comprising the steps of:

receiving and queuing data transfer requests specifying a source port and a destination port;

dispatching a queued data transfer request from queue to an assigned channel upon detection of an open channel of a plurality of channels;

sending a source read request corresponding to a data transfer request directed to a specified source port to said source port upon detection said source port is open and that a write buffer memory provided for said assigned channel has room to store data corresponding to said source read request;

receiving a read response signal from said source port in response to said source read request;

storing received read response signals in a read response buffer memory corresponding to said source port;

receiving read data from said source port in response to said source read request;

storing received read data in a write buffer memory of said assigned channel;

sending a destination write request and write data corresponding to a data transfer request directed to a specified destination port to said destination port from said write buffer memory of said assigned channel; and wherein said write buffer memory of said assigned channel is configured to simultaneously store received read data corresponding to plural data transfer requests for plural channels by storing read data for a data transfer request before sending a destination write request and write data for an earlier received data transfer request.

2. A data transfer controller comprising:

a plurality of data ports, a first plurality of said data ports to supply read data in response to a data read request and a second plurality of said data port to store write data in response to a write request;

a plurality of channel parameter registers, each configured to store fixed parameters of a corresponding data transfer channel;

a plurality of port parameter registers, each configured to store fixed parameters of a corresponding one of said plurality of data ports;

a plurality of channel registers, each configured to store parameters variable parameters of a corresponding data transfer channel;

a source pipeline configured to generate a read request for read data from one of said first plurality of data ports according to an assigned channel;

a read response buffer provided for each source port to store read response data returned form one of said first plurality of data ports in response to a read request;

a write data buffer provided for each channel connected to said first plurality of data ports to store read data returned from one of said first plurality of data ports in response to a read request;

a destination pipeline connected to said write data buffer and said read response buffer to generate a write request to request a write of data stored in said write data buffer to one of said second plurality of data ports according to an assigned channel; and a request queue manager connected to said channel parameter registers, said port parameter registers, said channel registers, said source pipeline and said destination pipeline, said request queue manager:

storing and prioritizing received data transfer requests, issuing a source read request corresponding to a stored data transfer request directed to a specified source port to said source port upon detection said source port is open and said write data buffer has room to store data corresponding to said source read request, receiving read response data from said source port, storing said received read response data in said corresponding read response buffer and sending an acknowledge signal back to said source port, receiving read data from said source port and storing said received read data in said write data buffer, including storing in said write data buffer received read data corresponding to plural data transfer request for plural channels, issuing a destination write request and write data corresponding to a stored data transfer request directed to a specified destination port to said destination port, wherein said request queue manager is configured to store read data for a data transfer request before sending a destination write request and write data for an earlier received data transfer request.

* * * * *